United States Patent
Zhang et al.

(10) Patent No.: US 10,015,133 B2
(45) Date of Patent: Jul. 3, 2018

(54) VALUE-ADDED SERVICE DEPLOYMENT METHOD, NETWORK DEVICE, AND VALUE-ADDED SERVICE DEVICE

(71) Applicant: Huawei Technologies Co., Ltd., Shenzhen (CN)

(72) Inventors: Xianguo Zhang, Shenzhen (CN); Yang Shi, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 240 days.

(21) Appl. No.: 15/191,225

(22) Filed: Jun. 23, 2016

(65) Prior Publication Data

US 2016/0308827 A1    Oct. 20, 2016

Related U.S. Application Data

(63) Continuation of application No. PCT/CN2013/090360, filed on Dec. 24, 2013.

(51) Int. Cl.
*G06F 15/173* (2006.01)
*H04L 29/12* (2006.01)
(Continued)

(52) U.S. Cl.
CPC ...... *H04L 61/2592* (2013.01); *H04L 12/4633* (2013.01); *H04L 12/4641* (2013.01);
(Continued)

(58) Field of Classification Search
None
See application file for complete search history.

(56) References Cited

U.S. PATENT DOCUMENTS

| | | | |
|---|---|---|---|
| 2011/0231899 A1 | 9/2011 | Pulier et al. | |
| 2012/0044920 A1 | 2/2012 | Wang et al. | |

(Continued)

FOREIGN PATENT DOCUMENTS

| | | |
|---|---|---|
| CN | 101888703 A | 11/2010 |
| CN | 102411510 A | 4/2012 |

(Continued)

OTHER PUBLICATIONS

"Netword Functions Virtualisation(NFV); Use Cases," XP055224702, ETSI GS NFV 001 V1.1.1, Oct. 2013, 50 pages.
(Continued)

*Primary Examiner* — Brian Whipple
(74) *Attorney, Agent, or Firm* — Conley Rose, P.C.

(57) ABSTRACT

A value-added service deployment method, a network device, and a value-added service device, which relates to the field of network communications. The network device receives a first registration request message sent by the value-added service device, where the first registration request message includes an Internet Protocol (IP) address of the value-added service device, where the network device acquires virtual system information of a virtual system generated by the value-added service device for the network device according to the first registration request message, the network device allocates a virtual slot and a slot number to the virtual system and sends the slot number to the virtual system according to the virtual system information, and the network device manages the virtual system as a value-added service board of the network device.

20 Claims, 9 Drawing Sheets

(51) Int. Cl.
    *H04L 12/741* (2013.01)
    *H04L 12/46* (2006.01)
    *H04L 29/06* (2006.01)
    *H04L 29/08* (2006.01)

(52) U.S. Cl.
    CPC .......... *H04L 45/74* (2013.01); *H04L 65/1073* (2013.01); *H04L 67/16* (2013.01); *H04L 61/6022* (2013.01)

(56) References Cited

U.S. PATENT DOCUMENTS

| | | | |
|---|---|---|---|
| 2012/0155442 A1 | 6/2012 | Haddad et al. | |
| 2012/0297240 A1 | 11/2012 | Jalan et al. | |
| 2014/0040466 A1* | 2/2014 | Yang .................. | H04L 1/22 709/224 |

FOREIGN PATENT DOCUMENTS

| | | | |
|---|---|---|---|
| CN | 102710509 A | 10/2012 | |
| CN | 103262585 A | 8/2013 | |
| EP | 1796334 A1 | 6/2007 | |

OTHER PUBLICATIONS

Foreign Communication From a Counterpart Application, European Application No. 13900383.4, European Office Action dated Feb. 6, 2018, 7 pages.
Machine Translation and Abstract of Chinese Publication No. CN102411510, Apr. 11, 2012, 8 pages.
"Network Functions Vlrtualisation (NFV); Architectural Framework," XP055205312, Group Specification, ETSI GS NFV 002, V1.1.1, Oct. 2013, 22 pages.
Foreign Communication From a Counterpart Application, Chinese Application No. 201380003573.3, Chinese Office Action dated Apr. 28, 2017, 3 pages.
Foreign Communication From a Counterpart Application, Chinese Application No. 201380003573.3, Chinese Search Report dated Apr. 21, 2017, 2 pages.
Foreign Communication From a Counterpart Application, European Application No. 13900383.4, Extended European Search Report dated Mar. 31, 2017, 9 pages.
Foreign Communication From a Counterpart Application, PCT Application No. PCT/CN2013/090360, English Translation of International Search Report dated Oct. 9, 2014, 2 pages.
Foreign Communication From a Counterpart Application, PCT Application No. PCT/CN2013/090360, English Translation of Written Opinion dated Oct. 9, 2014, 6 pages.

* cited by examiner

VALUE-ADDED SERVICE DEPLOYMENT METHOD, NETWORK DEVICE, AND VALUE-ADDED SERVICE DEVICE

CROSS-REFERENCE TO RELATED APPLICATION

This application is a continuation of International Application No. PCT/CN2013/090360, filed on Dec. 24, 2013, which is hereby incorporated by reference in its entirety.

TECHNICAL FIELD

The present disclosure relates to the field of network communications, and in particular, to a value-added service deployment method, a network device, and a value-added service device.

BACKGROUND

In a communications network, a deployment location of a value-added service device such as a firewall, a load balancer, an intrusion prevention system (IPS), a data loss prevention (DLP) device, an anti-virus (AV) device, or an application acceleration device is usually closely associated with a network topology. That is, the value-added service device is generally deployed in a forwarding path of a service flow that needs to be processed by the value-added service device, or deployed on a network device (such as a router or a switch) in a forwarding path in bypass mode.

When the foregoing deployment manner is used, in each location in which value-added service processing is required, an independent value-added service device needs to be deployed according to a maximum capacity required in the location, which causes a waste of device resources. Furthermore, in the foregoing bypass deployment manner, complicated policy-based routing needs to be configured on the network device, to distribute a service flow that enters the network device to the value-added service device, which increases the burden of configuration, management, and maintenance on the network device.

In addition, there is a solution named value-added service board. In the solution, an independent value-added service board is developed for each type of value-added service, and a corresponding value-added service is implemented by inserting a required value-added service board into a network device. Although this manner can simplify configuration of the network device and reduce burden on the network device, a dedicated value-added service board still needs to be configured for the network device in each location in which value-added service processing is required. Therefore, the problem of a device resource waste still exists. Further, a quantity of addable value-added service boards is limited by a design specification of the network device, and service extension is not flexible enough.

In conclusion, there is no value-added service deployment method that can save device resources and implement flexible service extension.

SUMMARY

In order to resolve the foregoing problems in the prior art, the present disclosure provides a value-added service deployment method, a network device, and a value-added service device, which can save device resources and implement flexible extension of a value-added service.

A first aspect of the present disclosure provides a value-added service deployment method, including receiving, by a network device, a first registration request message sent by a value-added service device, where the first registration request message includes an Internet Protocol (IP) address of the value-added service device, acquiring, according to the first registration request message, virtual system information of a virtual system generated by the value-added service device for the network device, allocating a virtual slot and a slot number to the virtual system, and sending the slot number to the virtual system according to the virtual system information, and managing the virtual system as a value-added service board of the network device.

With reference to the first aspect, in a first implementation manner of the first aspect, acquiring, according to the first registration request message, virtual system information of a virtual system generated by the value-added service device for the network device includes sending a first allocation request message to the value-added service device according to the first registration request message, where the first allocation request message includes a service requirement of the network device, receiving a first allocation response message sent by the value-added service device, where the first allocation response message includes the virtual system information of the virtual system generated by the value-added service device for the network device, and acquiring the virtual system information from the first allocation response message.

With reference to the first aspect, in a second implementation manner of the first aspect, when the first registration request message further includes the virtual system information, acquiring, according to the first registration request message, virtual system information of a virtual system generated by the value-added service device for the network device includes acquiring, from the first registration request message, the virtual system information of the virtual system generated by the value-added service device for the network device.

With reference to the first aspect, or the first or the second implementation manner of the first aspect, in a third implementation manner of the first aspect, before receiving, by a network device, a first registration request message sent by a value-added service device, the method further includes receiving a configuration message sent by a management device, where the configuration message includes the IP address of the value-added service device, and establishing a first mapping relationship between an IP address of the network device and the IP address of the value-added service device according to the configuration message, and after receiving, by a network device, a first registration request message sent by a value-added service device, the method further includes performing authentication on the value-added service device according to the first mapping relationship, and executing the operation of acquiring virtual system information of a virtual system generated by the value-added service device for the network device after authentication succeeds.

With reference to the first aspect, or the first, the second, or the third implementation manner of the first aspect, in a fourth implementation manner of the first aspect, the method further includes storing, in a mapping table, a second mapping relationship including the IP address of the value-added service device, the virtual system information, and the slot number.

With reference to the fourth implementation manner of the first aspect, in a fifth implementation manner of the first aspect, the method further includes receiving a second registration request message sent by the value-added service device, after the value-added service device or the virtual system restarts, where the second registration request message includes the IP address of the value-added service device, and allocating the slot number to the virtual system according to the second registration request message.

With reference to the fifth implementation manner of the first aspect, in a sixth implementation manner of the first aspect, when the second registration request message further includes the virtual system information, allocating the slot number to the virtual system according to the second registration request message includes searching the mapping table according to the virtual system information, to obtain the second mapping relationship, and allocating the slot number in the second mapping relationship to the virtual system.

With reference to the fifth implementation manner of the first aspect, in a seventh implementation manner of the first aspect, allocating the slot number to the virtual system according to the second registration request message includes searching the mapping table according to the IP address of the value-added service device, to obtain the second mapping relationship, sending a second allocation request message to the value-added service device, where the second allocation request message includes the virtual system information in the second mapping relationship, receiving a second allocation response message sent by the value-added service device, where the second allocation response message includes the virtual system information, and allocating the slot number in the second mapping relationship to the virtual system according to the second allocation response message.

With reference to the first aspect or any one of the first to the seventh implementation manners of the first aspect, in an eighth implementation manner of the first aspect, the method further includes establishing a bidirectional extended generic routing encapsulation (GRE) tunnel between the network device and the virtual system according to the virtual system information, where the bidirectional extended GRE tunnel is used to carry an extended GRE-encapsulated message, and the extended GRE-encapsulated message includes a slot number field.

With reference to the eighth implementation manner of the first aspect, in a ninth implementation manner of the first aspect, managing the virtual system as a value-added service board of the network device includes at least one of the following manners: receiving a heartbeat message periodically sent by the virtual system, and suspending sending of a service flow that needs to be processed by the virtual system to the virtual system when the heartbeat message sent by the virtual system is not received after a preset time, receiving a heartbeat message sent by the virtual system, where the heartbeat message includes a resource usage rate of the virtual system, controlling, according to the resource usage rate, a service flow destined for the virtual system, receiving a heartbeat message sent by the virtual system, where the heartbeat message includes a control flag, and sending a service flow to the virtual system according to the control flag.

A second aspect of the present disclosure provides another value-added service deployment method, including receiving, by a value-added service device, a configuration message sent by a management device, where the configuration message includes an IP address of a network device, generating, by the value-added service device, a first registration request message according to the configuration message, where the first registration request message includes an IP address of the value-added service device, generating, by the value-added service device, a virtual system for the network device, allocating virtual system information to the virtual system, and sending, by the value-added service device, the first registration request message and the virtual system information to the network device, where the virtual system information is used to enable the network device to manage the virtual system as a value-added service board of the network device.

With reference to the second aspect, in a first implementation manner of the second aspect, the configuration message further includes a service requirement of the network device, where generating a virtual system for the network device includes generating the virtual system for the network device according to the service requirement in the configuration message, and sending the first registration request message and the virtual system information to the network device includes adding the virtual system information to the first registration request message, and sending, to the network device, the first registration request message to which the virtual system information is added.

With reference to the second aspect, in a second implementation manner of the second aspect, generating a virtual system for the network device includes receiving a first allocation request message sent by the network device, where the first allocation request message includes a service requirement of the network device, generating the virtual system for the network device according to the service requirement of the network device, and sending the first registration request message and the virtual system information to the network device includes sending the first registration request message to the network device before the receiving a first allocation request message sent by the network device, and sending the virtual system information to the network device using a first allocation response message, after receiving a first allocation request message sent by the network device.

With reference to the second aspect, or the first or the second implementation manner of the second aspect, in a third implementation manner of the second aspect, after generating a virtual system for the network device, and allocating virtual system information to the virtual system, the method further includes storing, by the value-added service device in a mapping table, a mapping relationship between the IP address of the network device and the virtual system information.

With reference to the third implementation manner of the second aspect, in a fourth implementation manner of the second aspect, the method further includes generating, by the value-added service device, a second registration request message according to the mapping relationship, after the value-added service device or the virtual system restarts, where the second registration request message includes the IP address of the value-added service device, acquiring, by the value-added service device, the virtual system information, and sending, by the value-added service device, the second registration request message and the virtual system information to the network device.

With reference to the fourth implementation manner of the second aspect, in a fifth implementation manner of the second aspect, acquiring, by the value-added service device, the virtual system information includes acquiring, by the value-added service device, the virtual system information according to the mapping relationship, and sending, by the value-added service device, the second registration request message and the virtual system information to the network device includes adding, by the value-added service device, the virtual system information to the second registration request message, and sending, to the network device, the second registration request message to which the virtual system information is added.

With reference to the fourth implementation manner of the second aspect, in a sixth implementation manner of the second aspect, sending, by the value-added service device, the second registration request message and the virtual system information to the network device includes sending, by the value-added service device, the second registration request message to the network device, receiving a second allocation request message sent by the network device, where the second allocation request message includes the virtual system information, and the second allocation request message is used to request the value-added service device to reallocate the virtual system to the network device, searching the mapping table according to the second allocation request message, to obtain the mapping relationship, generating a second allocation response message, after it is determined, according to the mapping relationship, that the virtual system is already allocated to the network device, and sending the second allocation response message to the network device, where the second allocation response message includes the virtual system information.

A third aspect of the present disclosure provides a network device, including a communication interface configured to communicate with a value-added service device, a memory configured to store a program, and a processor configured to execute the program to receive a first registration request message sent by the value-added service device, where the first registration request message comprises an IP address of the value-added service device, acquire, according to the first registration request message, virtual system information of a virtual system generated by the value-added service device for the network device, allocate a virtual slot and a slot number to the virtual system, send the slot number to the virtual system according to the virtual system information, and manage the virtual system as a value-added service board of the network device.

A fourth aspect of the present disclosure provides a value-added service device, including a communication interface configured to communicate with a management device, a memory configured to store a program, and a processor configured to execute the program to receive a configuration message sent by the management device, where the configuration message comprises an IP address of a network device, generate a first registration request message according to the configuration message, where the first registration request message comprises an IP address of the value-added service device, generate a virtual system for the network device, and allocate virtual system information to the virtual system, and send the first registration request message and the virtual system information to the network device, where the virtual system information is used to enable the network device to manage the virtual system as a value-added service board of the network device. According to the present disclosure, a value-added service device and a network device are separately disposed such that the value-added service device generates a virtual system for the network device according to a service requirement of the network device, and the network device allocates a virtual slot and a slot number to the virtual system, and manages the virtual system as a value-added service board of the network device. This avoids a problem of complicated policy-based routing configuration that arises when the network device is connected to another value-added service device, implements on-demand deployment and flexible extension of a value-added service, and saves a resource for the value-added service device. Furthermore, the network device communicates, through a bidirectional extended GRE tunnel, with the virtual system that is used as the value-added service board, thereby avoiding a problem of incompatibility between devices of different manufacturers that arises when a proprietary protocol is run between a main control board and a service board of the network device. In addition, the present disclosure ensures that, when the value-added service device or a virtual system restarts, the virtual system can acquire, from the network device, a slot number the same as that before the value-added service device or the virtual system restarts, thereby avoiding a service conflict that may be caused by slot number reallocation.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
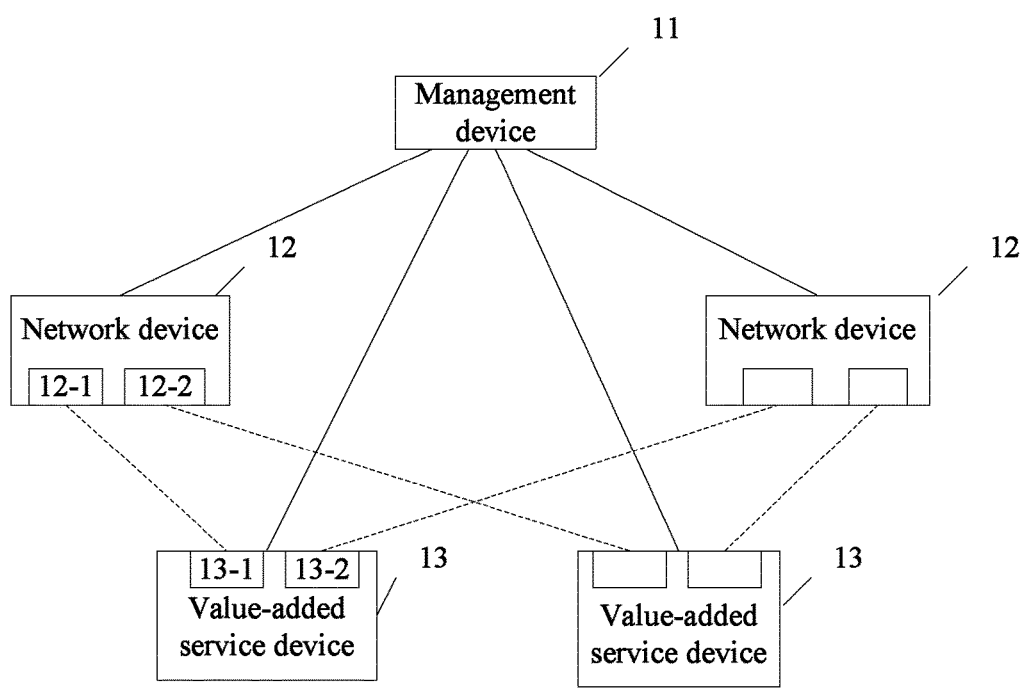
FIG. 1 is a schematic diagram of a structure of a network system according to an embodiment of the present disclosure.

FIG. 1 is a schematic diagram of a structure of a network system according to an embodiment of the present disclosure. As shown in FIG. 1, the network system includes a management device 11, a network device 12, and a value-added service device 13. The management device 11 is configured to manage the network device 12 and the value-added service device 13. There may be one or more network devices 12 and value-added service devices 13. The value-added service device 13 may provide a value-added service for multiple network devices 12 in a manner of establishing a virtual system (for example, 13-1 and 13-2 in FIG. 1) for each of the multiple network devices 12. In a case in which one network device 12 requires multiple value-added services, a quantity of virtual systems established for the network device 12 is the same as a quantity of value-added services required by the network device 12. The network device 12 may acquire the multiple value-added services in a manner of allocating a virtual slot (for example, 12-1 and 12-2 in FIG. 1) to each virtual system. The network device 12 may be a router or a network switch.

The management device 11 acquires a service requirement of the network device 12, where the service requirement includes a value-added service type and a value-added service specification that are required by the network device. The management device 11 allocates the value-added service device 13 to the network device 12 according to the service requirement of the network device 12. The service requirement may be configured by a network administrator on the management device 11 for the network device 12, or may be sent by the network device 12 to the management device 11. The management device 11 may take a network topology into consideration when allocating the value-added service device 13 to the network device 12, where the network topology is used to enable the management device 11 to select, from multiple value-added service devices 13 that can meet the service requirement, a value-added service device nearest to the network device 12.

The management device 11 may allocate multiple value-added service devices 13 to the network device 12 according to the service requirement. These value-added service devices 13 may separately provide different types of value-added services. In this embodiment, description is made by assuming that only one value-added service device 13 is allocated. After allocation is completed, the management device 11 sends a configuration message to the network device 12 and the value-added service device 13 respectively, where a configuration message is a message of a special type extended in this embodiment of the present disclosure, and is used to enable the network device 12 and the value-added service device 13 to establish a service group. A value-added service device in a service group can provide a value-added service for a network device in the service group.

A configuration message sent to the network device 12 includes an identifier of the value-added service device 13, and a configuration message sent to the value-added service device 13 includes an identifier of the network device 12.

Figure 2:
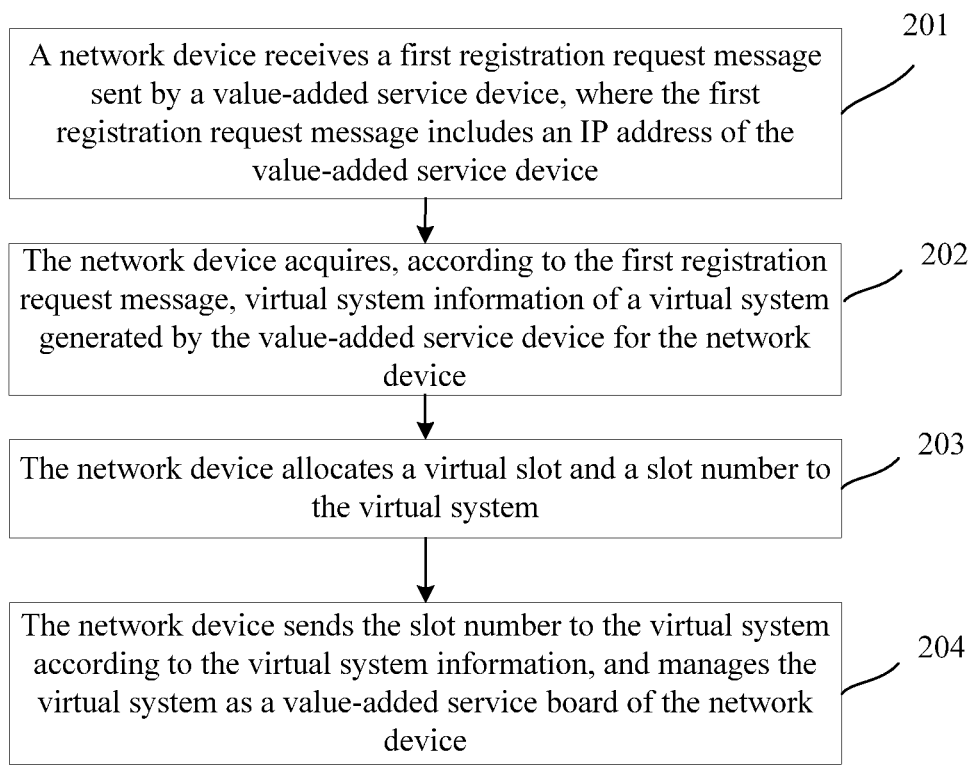
FIG. 2 is a schematic flowchart of a value-added service deployment method according to an embodiment of the present disclosure.

Based on the network system shown in FIG. 1, an embodiment of the present disclosure provides a value-added service deployment method, where the method is executed by the network device 12. As shown in FIG. 2, the method includes the following steps.

Step 201: A network device receives a first registration request message sent by a value-added service device, where the first registration request message includes an IP address of the value-added service device.

The first registration request message is used to request the network device to establish a service group with the value-added service device such that the value-added service device provides a value-added service for the network device.

Step 202: The network device acquires, according to the first registration request message, virtual system information of a virtual system generated by the value-added service device for the network device.

The virtual system is a virtual value-added service device that is generated by the value-added service device according to a service requirement of the network device and that is used to provide a value-added service for the network device.

The virtual system information includes an IP address of the virtual system, and may further include a device name, a virtual media access control (MAC) address, a service type, and the like of the virtual system.

Step 203: The network device allocates a virtual slot and a slot number to the virtual system.

The virtual slot is used to implement a communication connection between the network device and the virtual system.

Step 204: The network device sends the slot number to the virtual system according to the virtual system information, and manages the virtual system as a value-added service board of the network device.

In the foregoing embodiment of the present disclosure, a value-added service device and a network device are separately disposed such that the value-added service device generates a virtual system for the network device according to a service requirement of the network device, and the network device allocates a virtual slot and a slot number to the virtual system, and manages the virtual system as a value-added service board of the network device. This avoids a problem of complicated policy-based routing configuration that arises when the network device is connected to another value-added service device, implements on-demand deployment and flexible extension of a value-added service, and saves a resource for the value-added service device.

Figure 3:
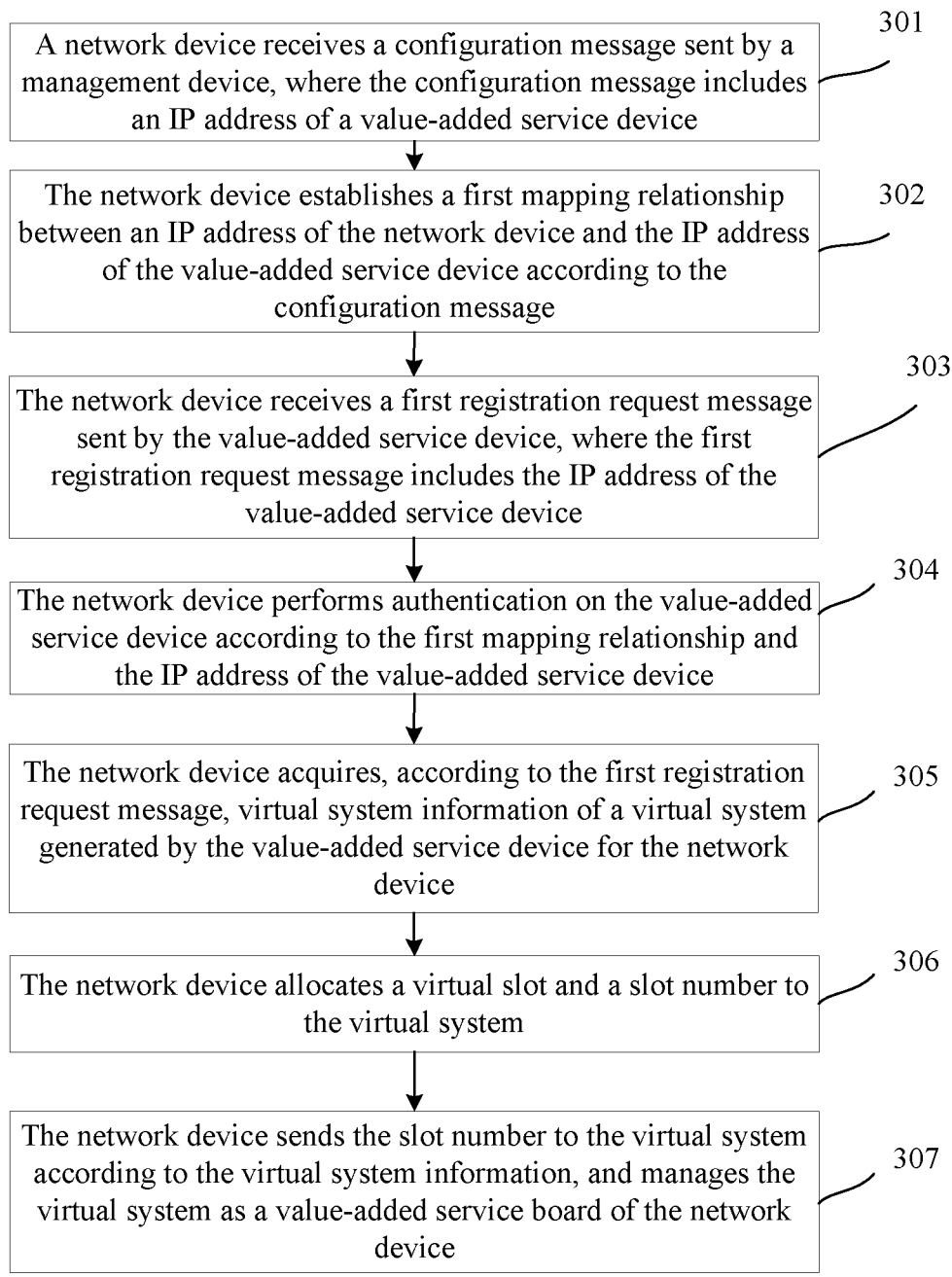
FIG. 3 is a schematic flowchart of another value-added service deployment method according to an embodiment of the present disclosure.

As shown in FIG. 3, based on the embodiment shown in FIG. 2, an embodiment of the present disclosure provides another value-added service deployment method device. The method includes the following steps.

Step 301: A network device receives a configuration message sent by a management device, where the configuration message includes an IP address of a value-added service device.

The configuration message is used to enable the network device to establish a service group with the value-added service device such that the network device can accept a value-added service provided by the value-added service device.

Step 302: The network device establishes a first mapping relationship between an IP address of the network device and the IP address of the value-added service device according to the configuration message.

Step 303: The network device receives a first registration request message sent by the value-added service device, where the first registration request message includes the IP address of the value-added service device.

The first registration request message is used to request the network device to establish a service group with the value-added service device such that the value-added service device provides a value-added service for the network device.

Step 304: The network device performs authentication on the value-added service device according to the first mapping relationship and the IP address of the value-added service device.

That is, the network device determines whether the IP address of the value-added service device is the IP address of the value-added service device in the first mapping relationship. If the IP address of the value-added service device is the IP address of the value-added service device in the first mapping relationship, authentication on the value-added service device succeeds. If the IP address of the value-added service device is not the IP address of the value-added service device in the first mapping relationship, authentication on the value-added service device fails. After authentication on the value-added service device succeeds, the network device continues to execute step 305.

Step 305: The network device acquires, according to the first registration request message, virtual system information of a virtual system generated by the value-added service device for the network device.

Furthermore, after determining that the value-added service device is a device that is selected by the management device and that is capable of providing a value-added service for the network device, the network device acquires the virtual system information of the virtual system generated by the value-added service device for the network device.

In an embodiment, after receiving a configuration message sent by the management device, the value-added service device generates a virtual system for the network device according to a service requirement of the network device in the configuration message, allocates virtual system information to the virtual system, adds the virtual system information to the first registration request message, and sends the first registration request message to the network device. In this case, when the first registration request message further includes the virtual system information, the network device acquires the virtual system information from the first registration request message.

In another embodiment, the configuration message does not include a service requirement of the network device. After receiving a configuration message sent by the management device, the value-added service device does not immediately generate a virtual system for the network device according to the configuration message. Therefore, the first registration request message does not include the virtual system information. In this case, the network device sends a first allocation request message to the value-added service device according to the first registration request message, where the first allocation request message includes the service requirement of the network device, and is used to request the value-added service device to generate the virtual system for the network device according to the service requirement. Then, the network device receives a first allocation response message sent by the value-added service device, where the first allocation response message includes the virtual system information of the virtual system generated by the value-added service device for the network device, and the network device acquires the virtual system information from the first allocation response message.

Step 306: The network device allocates a virtual slot and a slot number to the virtual system.

The virtual slot is used to implement a communication connection between the network device and the virtual system.

The network device allocates the slot number to the virtual slot, which is numbering virtual slot sequentially after a physical slot. For example, if the network device already has three physical slots with slot numbers 1, 2, and 3 respectively, the network device allocates a slot number 4 to a virtual slot of a first virtual system, a slot number 5 to a virtual slot of a second virtual system, and so on. Because the virtual system is in a one-to-one correspondence with the slot number, the slot number enables the network device to identify the virtual system.

Step 307: The network device sends the slot number to the virtual system according to the virtual system information, and manages the virtual system as a value-added service board of the network device.

Before the network device sends the slot number to the virtual system according to the virtual system information, optionally, the method further includes establishing a tunnel between the network device and the virtual system using the virtual slot. The tunnel is preferably a bidirectional extended GRE tunnel. A message sent between the virtual system and the network device is an extended GRE-encapsulated message, and the extended GRE-encapsulated message includes at least the slot number. The bidirectional extended GRE tunnel may be automatically generated between the network device and the virtual system, or may be manually configured by an administrator.

Figure 4:
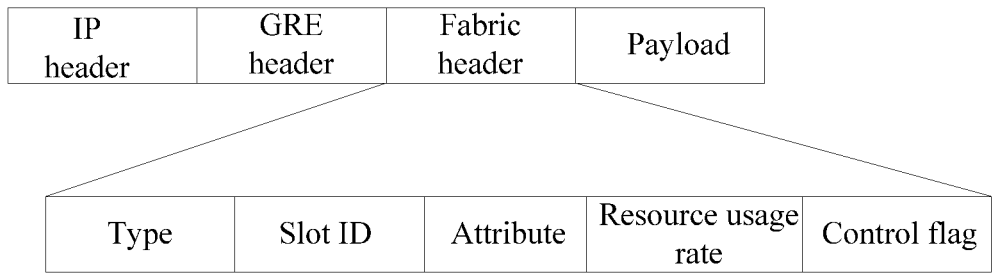
FIG. 4 is a schematic diagram of a structure of an extended GRE-encapsulated message according to an embodiment of the present disclosure.

A conventional GRE-encapsulated message includes an outer tunnel header, a GRE header, and a payload. The extended GRE-encapsulated message is generated by adding a fabric header to an original GRE-encapsulated packet. The fabric header may be added between the GRE header and the payload. FIG. 4 shows a schematic diagram of a structure of a packet in which the fabric header is added between the GRE header and the payload. The fabric header includes at least a slot number (field name: SlotID) field, and the fabric header may further include the following fields: type, attribute, bandwidth, and control flag. Meanings of the fields are as follows.

Type is used to represent a message type. For example, if a value of the Type field is 0, it indicates that the packet is a heartbeat message. If a value of the Type field is 1, it indicates that the packet is a service packet.

SlotID is used to carry a slot number of a message sender. When the message sender is the network device, SlotID is 0. When the message sender is a virtual system, SlotID is a slot number corresponding to the virtual system.

Attribute is used to represent an attribute of a virtual system corresponding to a SlotID, for example, whether the virtual system is a firewall or an IPS.

Occupancy is used to represent a resource usage rate of a virtual system corresponding to a SlotID.

Control flag is used to represent whether a virtual system allows the network device to send a service flow to the virtual system. For example, when Control flag is 1, it indicates that the network device is allowed to send a service flow to the virtual system. When Control flag is 0, it instructs the network device to stop sending a service flow to the virtual system.

In an embodiment of the present disclosure, managing the virtual system as a value-added service board of the network device may include any one of the following manners: receiving, by the network device, a heartbeat message periodically sent by the virtual system, and when the heartbeat message sent by the virtual system is not received after a preset time, suspending sending of a service flow that needs to be processed by the virtual system to the virtual system, receiving, by the network device, a heartbeat message sent by the virtual system, where the heartbeat message includes a resource usage rate of the virtual system, controlling, by the network device according to the resource usage rate, a service flow destined for the virtual system, for example, discarding a service flow or a packet in a service flow that is beyond a processing capability of the virtual system, or directly forwarding a service flow or a packet in a service flow that is beyond a processing capability of the virtual system to a next hop of the service flow, receiving, by the network device, a heartbeat message sent by the virtual system, where the heartbeat message includes a control flag, and sending, by the network device, a service flow to the virtual system according to the control flag, where the control flag may indicate that the network device is allowed to send a service flow to the virtual system, or instruct the network device to stop sending a service flow to the virtual system.

In another embodiment of the present disclosure, after the network device allocates the slot number to the virtual system, the network device further stores, in a mapping table, a second mapping relationship including the IP address of the value-added service device, the virtual system information, and the slot number.

After the value-added service device or the virtual system restarts, the method further includes receiving, by the network device, a second registration request message sent by the value-added service device, where the second registration request message includes the IP address of the value-added service device. Optionally, the second registration request message further includes the virtual system information. When the second registration request message further includes the virtual system information, the network device searches the mapping table according to the virtual system information, to obtain the second mapping relationship, and sends the slot number to the virtual system according to the virtual system information in the second mapping relationship. When the second registration request message does not include the virtual system information, the network device searches the mapping table according to the IP address of the value-added service device, to obtain the second mapping relationship. The network device sends a second allocation request message to the value-added service device, where the second allocation request message includes the virtual system information in the second mapping relationship, and is used to request the value-added service device to allocate the virtual system corresponding to the virtual system information to the network device. The network device receives a second allocation response message sent by the value-added service device, where the second allocation response message includes the virtual system information and indicates that the value-added service device agrees to allocate the virtual system to the network device, and the network device allocates the slot number in the second mapping relationship to the virtual system according to the second allocation response message.

In the foregoing embodiment of the present disclosure, a value-added service device and a network device are separately disposed such that the value-added service device generates a virtual system for the network device according to a service requirement of the network device, and the network device allocates a virtual slot and a slot number to the virtual system, and manages the virtual system as a value-added service board of the network device. This avoids a problem of complicated policy-based routing configuration that arises when the network device is connected to another value-added service device, implements on-demand deployment and flexible extension of a value-added service, and saves a resource for the value-added service device. Furthermore, the network device communicates, through a bidirectional extended GRE tunnel, with the virtual system that is used as the value-added service board, thereby avoiding a problem of incompatibility between devices of different manufacturers that arises when a proprietary protocol is run between a main control board and a service board of the network device. In addition, this embodiment of the present disclosure ensures that, when the value-added service device or a virtual system restarts, the virtual system can acquire, from the network device, a slot number the same as that before the value-added service device or the virtual system restarts, thereby avoiding a service conflict that may be caused by slot number reallocation.

Figure 5:
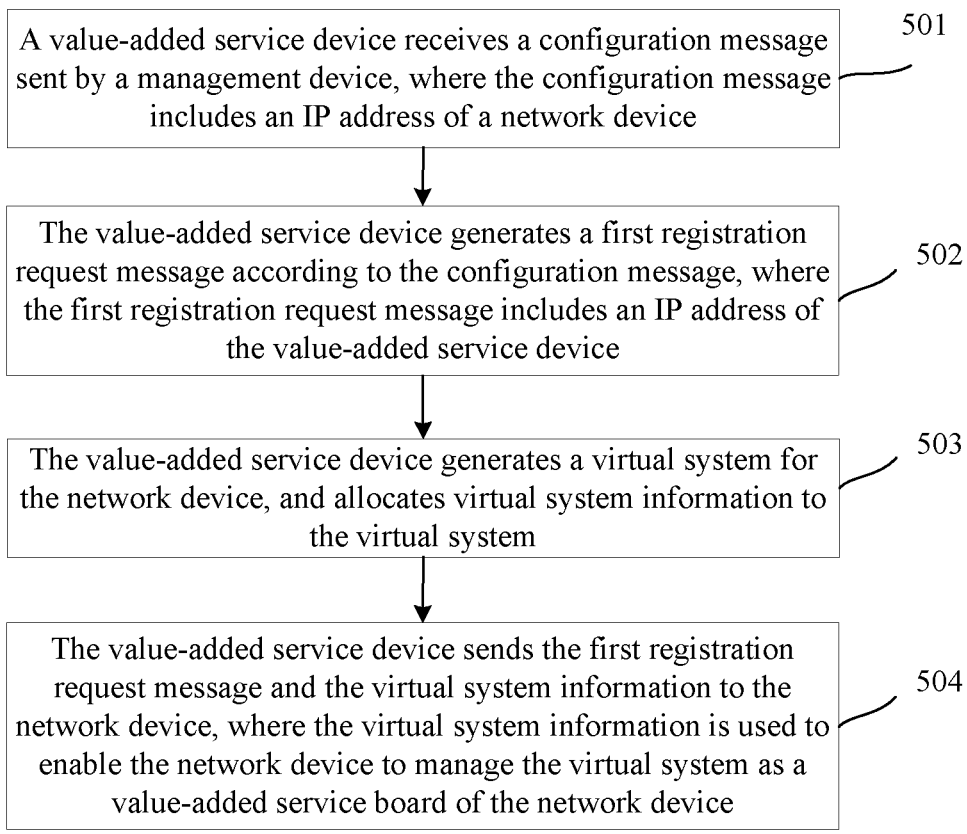
FIG. 5 is a schematic flowchart of another value-added service deployment method according to an embodiment of the present disclosure.

Based on the network system shown in FIG. 1, an embodiment of the present disclosure provides another value-added service deployment method, where the method is executed by the value-added service device 13. As shown in FIG. 5, the method includes the following steps.

Step 501: A value-added service device receives a configuration message sent by a management device, where the configuration message includes an IP address of a network device.

As described above, the configuration message is used to enable the value-added service device to establish a service group with the network device, and provide a value-added service for the network device.

Step 502: The value-added service device generates a first registration request message according to the configuration message, where the first registration request message includes an IP address of the value-added service device.

The first registration request message is used to request the network device to establish a service group with the value-added service device such that the value-added service device provides a value-added service for the network device.

Step 503: The value-added service device generates a virtual system for the network device, and allocates virtual system information to the virtual system.

In addition, the value-added service device further allocates, to the virtual system, a resource for value-added service processing.

Step 504: The value-added service device sends the first registration request message and the virtual system information to the network device, where the virtual system information is used to enable the network device to manage the virtual system as a value-added service board of the network device.

An execution sequence of the foregoing step 502, step 503 and step 504 may be different in different implementation manners.

For example, in an implementation manner, when the configuration message further includes a service requirement of the network device, step 503 further includes generating the virtual system for the network device according to the service requirement in the configuration message, and step 504 preferably includes adding, by the value-added service device, the virtual system information to the first registration request message, and sending, to the network device, the first registration request message to which the virtual system information is added. Certainly, in this case, in step 504, the value-added service device may also send the virtual system information separately using another message.

In another embodiment, when the configuration message does not include a service requirement of the network device, step 503 optionally further includes following steps.

Step 503*a*: The value-added service device receives a first allocation request message sent by the network device, where the first allocation request message includes a service requirement of the network device.

The first allocation request message is used to request the value-added service device to generate the virtual system for the network device according to the service requirement.

Step 503*b*: Generate the virtual system for the network device according to the service requirement of the network device, and allocate a virtual system identifier to the virtual system.

Step 504 further includes sending the first registration request message to the network device before the first allocation request message sent by the network device is received, and sending the virtual system information to the network device using a first allocation response message after the first allocation request message sent by the network device is received.

In the foregoing embodiment of the present disclosure, a value-added service device and a network device are separately disposed such that the value-added service device generates a virtual system for the network device according to a service requirement of the network device, and the network device allocates a virtual slot and a slot number to the virtual system, and manages the virtual system as a value-added service board of the network device. This avoids a problem of complicated policy-based routing configuration that arises when the network device is connected to another value-added service device, implements on-demand deployment and flexible extension of a value-added service, and saves a resource for the value-added service device.

Figure 6:
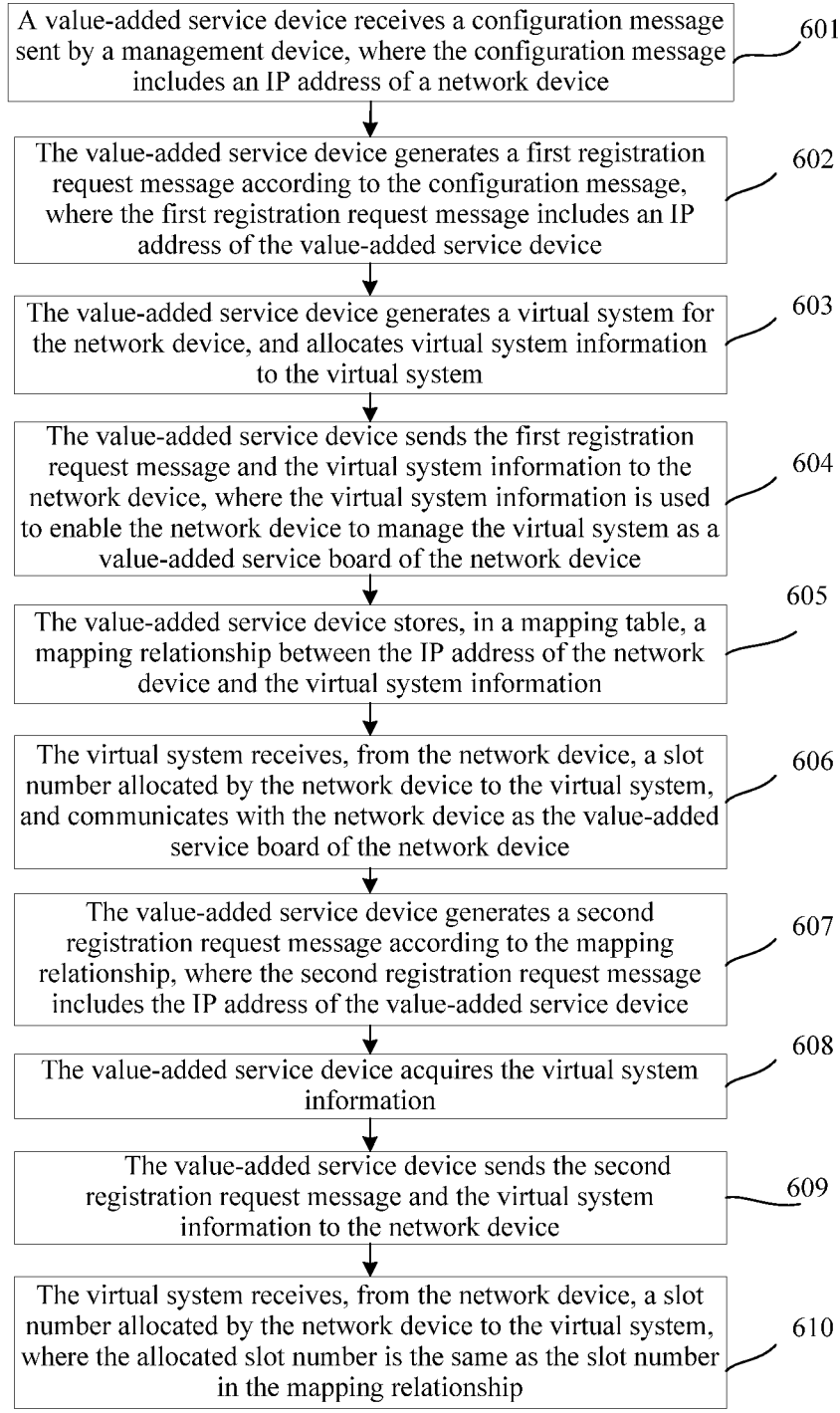
FIG. 6 is a schematic flowchart of another value-added service deployment method according to an embodiment of the present disclosure.

Based on the method shown in FIG. 5, an embodiment of the present disclosure provides another value-added service deployment method. As shown in FIG. 6, the method includes the following steps.

Step 601: A value-added service device receives a configuration message sent by a management device, where the configuration message includes an IP address of a network device.

Step 602: The value-added service device generates a first registration request message according to the configuration message, where the first registration request message includes an IP address of the value-added service device.

Step 603: The value-added service device generates a virtual system for the network device, and allocates virtual system information to the virtual system.

Step 604: The value-added service device sends the first registration request message and the virtual system information to the network device, where the virtual system information is used to enable the network device to manage the virtual system as a value-added service board of the network device.

The foregoing steps 601 to 604 are the same as steps 501 to 504 in FIG. 5.

The method may further include the following steps.

Step 605: The value-added service device stores, in a mapping table, a mapping relationship between the IP address of the network device and the virtual system information.

Step 606: The virtual system receives, from the network device, a slot number allocated by the network device to the virtual system, and communicates with the network device as the value-added service board of the network device.

The slot number is the slot number in step 307. The virtual system establishes a bidirectional extended GRE tunnel, which is described in the previous embodiment, between the network device and the virtual system, to communicate with the network device.

That the virtual system communicates with the network device as the value-added service board of the network device may include sending a heartbeat message to the network device, where the heartbeat message includes the slot number of the virtual system, or sending a heartbeat message to the network device, where the heartbeat message includes the slot number of the virtual system and a resource usage rate of the virtual system, or sending a heartbeat message to the network device, where the heartbeat message includes the slot number of the virtual system and a control flag, where the control flag may instruct the network device to start sending a service flow to the virtual system, or instruct the network device to stop sending a service flow to the virtual system.

After the value-added service device or the virtual system restarts, optionally, this embodiment of the present disclosure further includes the following steps.

Step 607: The value-added service device generates a second registration request message according to the mapping relationship, where the second registration request message includes the IP address of the value-added service device.

Because the virtual system is generated by the value-added service device and runs on the value-added service device, no matter whether the value-added service device restarts or the virtual system restarts, the value-added service device can perceive the restart. When the value-added service device restarts, the value-added service device generates a second registration request message separately for all network devices in the mapping table. When the virtual system restarts, the value-added service device generates a second registration request message for a network device corresponding to the virtual system.

Step 608: The value-added service device acquires the virtual system information.

Step 609: The value-added service device sends the second registration request message and the virtual system information to the network device.

An execution sequence of the foregoing step 607, step 608 and step 609 may be different in different embodiments.

For example, according to an embodiment of the present disclosure, in step 608, the value-added service device actively acquires the virtual system information from the mapping relationship, and step 609 preferably includes adding, by the value-added service device, the virtual system information to the second registration request message, and sending, to the network device, the second registration request message to which the virtual system information is added. Certainly, in this case, in step 609, the value-added service device may also send the virtual system information separately using another message.

In another embodiment, when the second registration request message does not include the virtual system information, step 609 includes receiving, by the value-added service device, a second allocation request message sent by the network device, where the second allocation request message includes the virtual system information, and the second allocation request message is used to request the value-added service device to reallocate the virtual system corresponding to the virtual system information to the network device, searching the mapping table according to the second allocation request message, to obtain the mapping relationship, and generating a second allocation response message and sending the second allocation response message to the network device after it is determined, according to the mapping relationship, that the virtual system is already allocated to the network device, where the second allocation response message includes the virtual system information.

Step 610: The virtual system receives, from the network device, a slot number allocated by the network device to the virtual system, where the allocated slot number is the same as the slot number in the mapping relationship.

In the foregoing embodiment of the present disclosure, a value-added service device and a network device are separately disposed such that the value-added service device generates a virtual system for the network device according to a service requirement of the network device, and the network device allocates a virtual slot and a slot number to the virtual system, and manages the virtual system as a value-added service board of the network device. This avoids a problem of complicated policy-based routing configuration that arises when the network device is connected to another value-added service device, implements on-demand deployment and flexible extension of a value-added service, and saves a resource for the value-added service device. Furthermore, the network device communicates, through a bidirectional extended GRE tunnel, with the virtual system that is used as the value-added service board, thereby avoiding a problem of incompatibility between devices of different manufacturers that arises when a proprietary protocol is run between a main control board and a service board of the network device. In addition, this embodiment of the present disclosure ensures that, when the value-added service device or a virtual system restarts, the virtual system can acquire, from the network device, a slot number the same as that before the value-added service device or the virtual system restarts, thereby avoiding a service conflict that may be caused by slot number reallocation.

Figure 7:
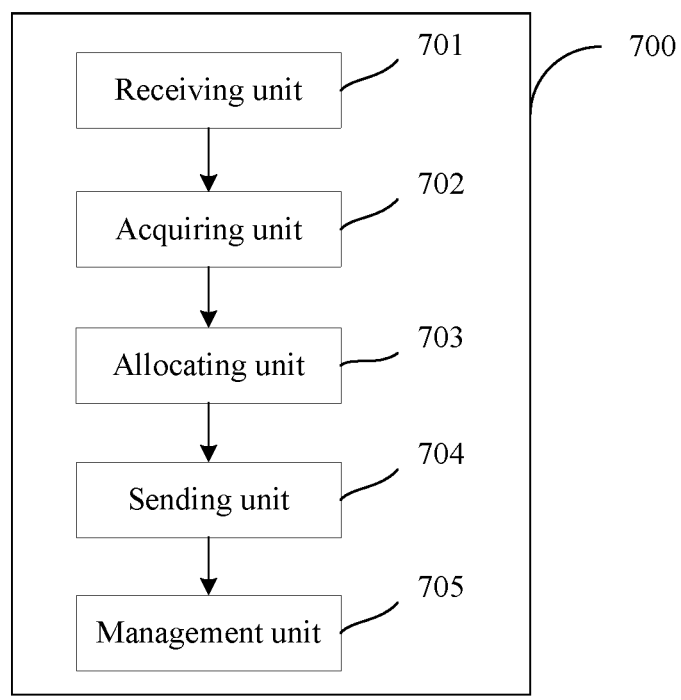
FIG. 7 is a schematic diagram of a structure of a network device according to an embodiment of the present disclosure.

In order to implement the embodiment shown in FIG. 2 of the present disclosure, an embodiment of the present disclosure provides a network device 700. The network device 700 may be the network device in FIG. 1. As shown in FIG. 7, the network device 700 includes a receiving unit 701, an acquiring unit 702, an allocating unit 703, a sending unit 704, and a management unit 705.

The receiving unit 701 is configured to receive a first registration request message sent by a value-added service device, where the first registration request message includes an IP address of the value-added service device.

The acquiring unit 702 is configured to acquire, according to the first registration request message, virtual system information of a virtual system generated by the value-added service device for the network device.

The allocating unit 703 is configured to allocate a virtual slot and a slot number to the virtual system.

The sending unit 704 is configured to send the slot number to the virtual system according to the virtual system information.

The management unit 705 is configured to manage the virtual system as a value-added service board of the network device.

Figure 8:
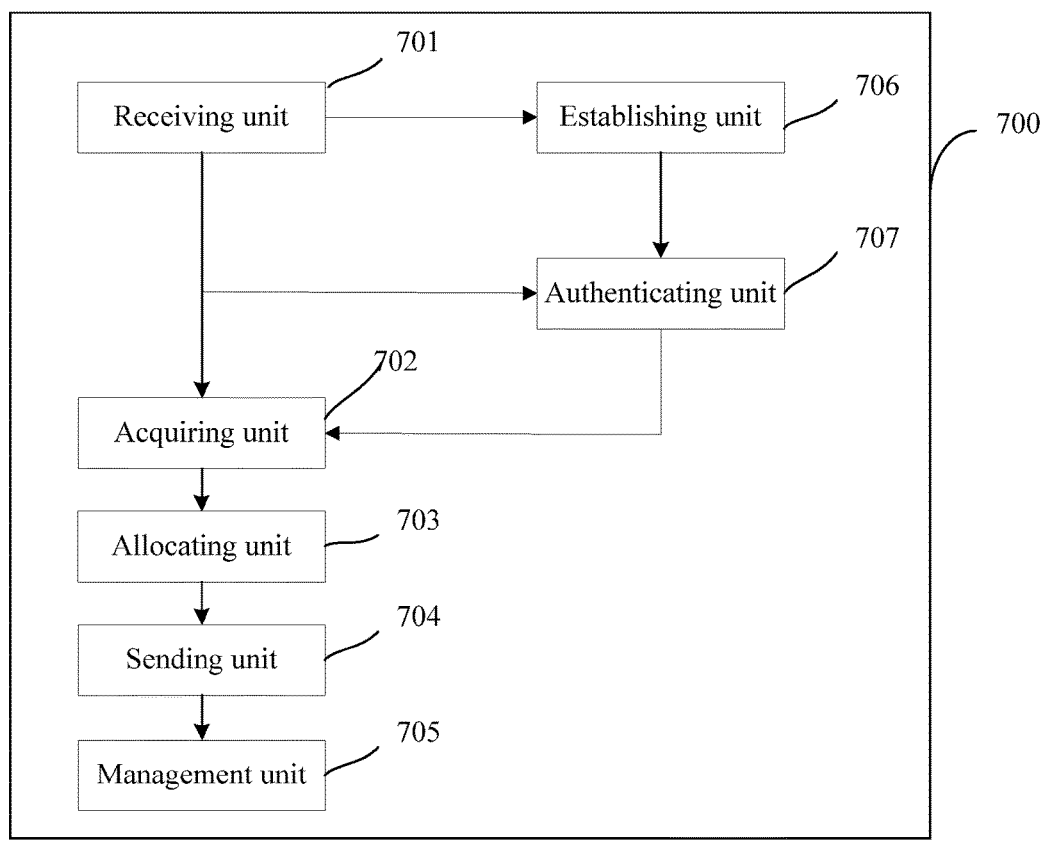
FIG. 8 is a schematic diagram of a structure of another network device according to an embodiment of the present disclosure.

Further, in order to implement the method shown in FIG. 3, as shown in FIG. 8, the network device 700 further includes an establishing unit 706 and an authenticating unit 707.

The receiving unit 701 is further configured to receive a configuration message sent by a management device, where the configuration message includes the IP address of the value-added service device.

The establishing unit 706 is configured to establish a first mapping relationship between an IP address of the network device and the IP address of the value-added service device according to the configuration message.

The authenticating unit 707 is configured to perform authentication on the value-added service device according to the first mapping relationship and the IP address of the value-added service device after the receiving unit 701 receives the first registration request message sent by the value-added service device.

The acquiring unit 702 is configured to acquire, according to the first registration request message, the virtual system information of the virtual system generated by the value-added service device for the network device after the authenticating unit 707 successfully authenticates the value-added service device.

In an embodiment, when the first registration request message further includes the virtual system information, the acquiring unit 702 acquires the virtual system information from the first registration request message.

In another embodiment, the acquiring unit 702 is configured to send a first allocation request message to the value-added service device according to the first registration request message, where the first allocation request message includes a service requirement of the network device, and is used to request the value-added service device to generate the virtual system for the network device according to the service requirement, receive a first allocation response message sent by the value-added service device, where the first allocation response message includes the virtual system information of the virtual system generated by the value-added service device for the network device, and acquire the virtual system information from the first allocation response message.

In another embodiment, the network device 700 further includes a storage unit (not shown) configured to store, in a mapping table, a second mapping relationship including the IP address of the value-added service device, the virtual system information, and the slot number.

The receiving unit 701 is further configured to receive a second registration request message sent by the value-added service device after the value-added service device or the virtual system restarts, where the second registration request message includes the IP address of the value-added service device, and the allocating unit 703 is further configured to allocate the slot number to the virtual system according to the second registration request message.

Furthermore, when the second registration request message further includes the virtual system information, the allocating unit 703 is configured to search the mapping table according to the virtual system information, to obtain the second mapping relationship, and allocate the slot number in the second mapping relationship to the virtual system.

When the second registration request does not include the virtual system information, the allocating unit 703 is configured to search the mapping table according to the IP address of the value-added service device, to obtain the second mapping relationship, send a second allocation request message to the value-added service device, where the second allocation request message includes the virtual system information in the second mapping relationship, receive a second allocation response message sent by the value-added service device, where the second allocation response message includes the virtual system information, and the second allocation response message indicates that the value-added service device agrees to allocate the virtual system information to the virtual system corresponding to the network device, and allocate the slot number in the second mapping relationship to the virtual system according to the second allocation response message.

In another embodiment, the network device 700 further includes a tunnel establishing unit (not shown) configured to establish a bidirectional extended GRE tunnel between the network device and the virtual system according to the virtual system information, where the bidirectional extended GRE tunnel is used to carry an extended GRE-encapsulated message, and the extended GRE-encapsulated message includes a slot number field.

In another embodiment, the management unit 705 is configured to receive a heartbeat message periodically sent by the virtual system, and suspend sending of a service flow that needs to be processed by the virtual system to the virtual system when the heartbeat message sent by the virtual system is not received after a preset time, or receive a heartbeat message sent by the virtual system, where the heartbeat message includes a resource usage rate of the virtual system, and control, according to the resource usage rate, a service flow destined for the virtual system, or receive a heartbeat message sent by the virtual system, where the heartbeat message includes a control flag, and send a service flow to the virtual system according to the control flag. The control flag may instruct the network device to start sending a service flow to the virtual system, or instruct the network device to stop sending a service flow to the virtual system.

Figure 9:
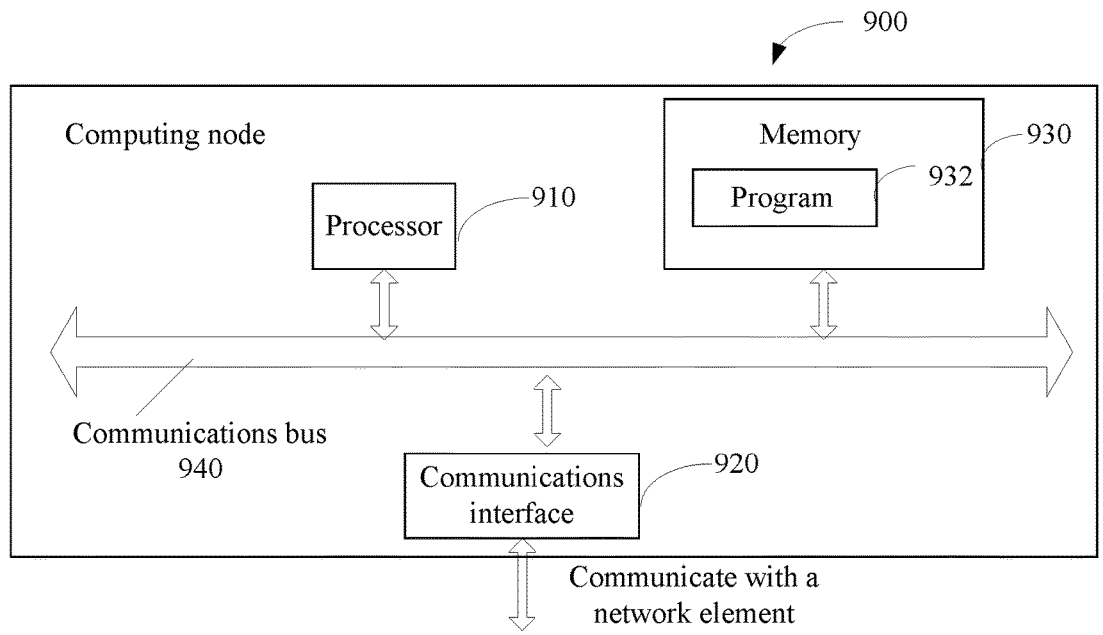
FIG. 9 is a schematic diagram of a structure of still another network device according to an embodiment of the present disclosure.

An embodiment of the present disclosure further provides a computing node 900. The computing node may be a host server having a computing capability, a router, a network switch, or the like, and specific implementation of the computing node is not limited in a specific embodiment of the present disclosure. As shown in FIG. 9, the computing node 900 includes a processor 910, a communications interface 920, a memory 930, and a communications bus 940.

The processor 910, the communications interface 920, and the memory 930 communicate with each other using the communications bus 940.

The communications interface 920 is configured to communicate with a network element such as a management device 11 and a value-added service device 13. The communications interface 920 may be implemented using an optical transceiver, an electrical transceiver, a wireless transceiver, or any combination thereof. For example, the optical transceiver may be a small form-factor pluggable (SFP) transceiver, an enhanced small form-factor pluggable (SFP+) transceiver, or a 10 Gigabit small form-factor pluggable (XFP) transceiver. The electrical transceiver may be an Ethernet network interface controller (NIC). The wireless transceiver may be a wireless network interface controller (WNIC). The communications interface 920 may include multiple physical interfaces. For example, the communications interface 920 includes multiple Ethernet interfaces.

The processor 910 is configured to execute a program 932.

Further, the program 932 may include program code, where the program code includes a computer operation instruction.

The processor 910 may be a central processing unit (CPU), or an application-specific integrated circuit (ASIC).

The memory 930 is configured to store the program 932. The memory 930 may include a volatile memory, such as a random access memory (RAM). The memory 930 may also include a non-volatile memory, such as a read-only memory (ROM), a flash memory, a hard disk, or a solid-state disk (SSD). The memory 930 may further include a combination of memories of the foregoing types.

The processor 910 is configured to execute the method shown in FIG. 2 or FIG. 3 according to the program 932.

In the foregoing embodiment of the present disclosure, a value-added service device and a network device are separately disposed such that the value-added service device generates a virtual system for the network device according to a service requirement of the network device, and the network device allocates a virtual slot and a slot number to the virtual system, and manages the virtual system as a value-added service board of the network device. This avoids a problem of complicated policy-based routing configuration that arises when the network device is connected to another value-added service device, implements on-demand deployment and flexible extension of a value-added service, and saves a resource for the value-added service device. Furthermore, the network device communicates, through a bidirectional extended GRE tunnel, with the virtual system that is used as the value-added service board, thereby avoiding a problem of incompatibility between devices of different manufacturers that arises when a proprietary protocol is run between a main control board and a service board of the network device. In addition, this embodiment of the present disclosure ensures that, when the value-added service device or a virtual system restarts, the virtual system can acquire, from the network device, a slot number the same as that before the value-added service device or the virtual system restarts, thereby avoiding a service conflict that may be caused by slot number reallocation.

Figure 10:
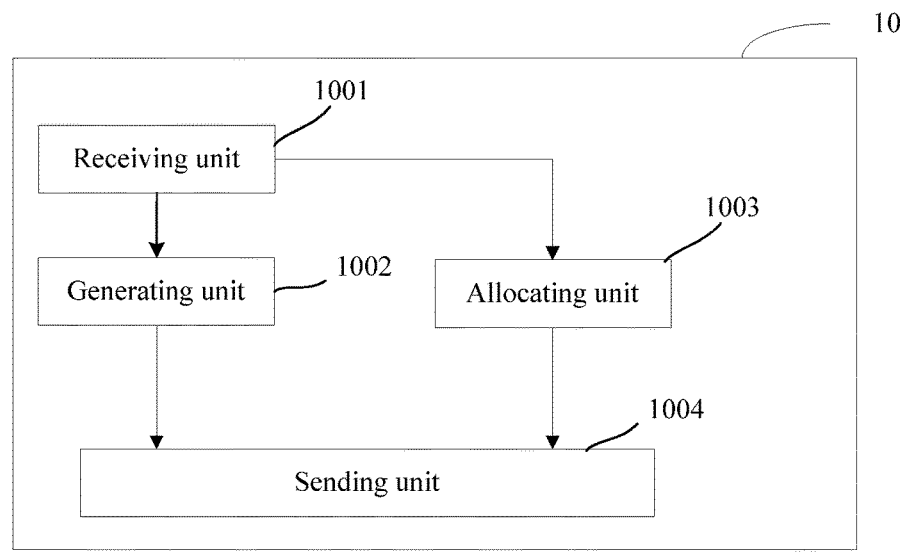
FIG. 10 is a schematic diagram of a structure of a value-added service device according to an embodiment of the present disclosure.

In order to implement the embodiment shown in FIG. 5 of the present disclosure, an embodiment of the present disclosure provides a value-added service device 10. The value-added service device 10 may be the value-added service device in FIG. 1. As shown in FIG. 10, the value-added service device 10 includes a receiving unit 1001, a generating unit 1002, an allocating unit 1003, and a sending unit 1004.

The receiving unit 1001 is configured to receive a configuration message sent by a management device, where the configuration message includes an IP address of a network device.

The generating unit 1002 is configured to generate a first registration request message according to the configuration message, where the first registration request message includes an IP address of the value-added service device.

The allocating unit 1003 is configured to generate a virtual system for the network device, and allocate virtual system information to the virtual system.

The sending unit 1004 is configured to send the first registration request message and the virtual system information to the network device, where the virtual system information is used to enable the network device to manage the virtual system as a value-added service board of the network device.

In an embodiment, the configuration message received by the receiving unit 1001 further includes a service requirement of the network device, and the allocating unit 1003 is configured to generate the virtual system for the network device according to the service requirement in the configuration message, and allocate the virtual system information to the virtual system, and the sending unit 1004 is configured to add the virtual system information to the first registration request message, and send, to the network device, the first registration request message to which the virtual system information is added.

In another embodiment, the receiving unit 1001 is further configured to receive a first allocation request message sent by the network device, where the first allocation request message includes a service requirement of the network device. The allocating unit 1003 is configured to generate the virtual system for the network device according to the service requirement of the network device, and allocate the virtual system information to the virtual system, and the sending unit 1004 is configured to send the first registration request message to the network device before the receiving unit receives the first allocation request message sent by the network device, and send the virtual system information to the network device using a first allocation response message after the receiving unit receives the first allocation request message sent by the network device.

Figure 11:
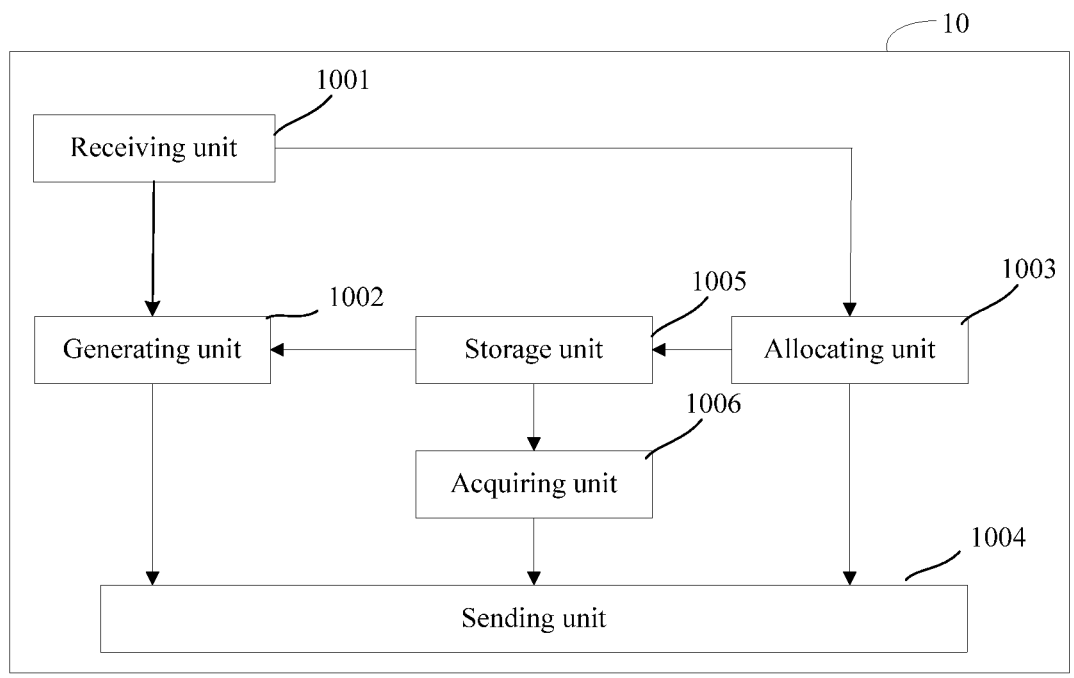
FIG. 11 is a schematic diagram of a structure of another value-added service device according to an embodiment of the present disclosure.

As shown in FIG. 11, to further execute the method shown in FIG. 6, based on FIG. 10, the value-added service device 10 further includes a storage unit 1005 and an acquiring unit 1006.

The storage unit 1005 is configured to store, in a mapping table, a mapping relationship between the IP address of the network device and the virtual system information.

The generating unit 1002 is further configured to generate a second registration request message according to the mapping relationship, where the second registration request message includes the IP address of the value-added service device after the value-added service device or the virtual system restarts.

The acquiring unit 1006 is configured to acquire the virtual system information.

The sending unit 1004 is further configured to send the second registration request message and the virtual system information to the network device.

In an embodiment, the acquiring unit 1006 is configured to acquire the virtual system information according to the mapping relationship, that is, read the virtual system information from the mapping relationship.

The sending unit 1004 is further configured to add the virtual system information to the second registration request message, and send, to the network device, the second registration request message to which the virtual system information is added.

In another embodiment, the sending unit 1004 is further configured to send the second registration request message to the network device. The receiving unit 1001 is further configured to receive a second allocation request message sent by the network device, where the second allocation request message includes the virtual system information, and the second allocation request message is used to request the value-added service device to reallocate the virtual system to the network device. The generating unit 1002 is further configured to search the mapping table according to the second allocation request message, to obtain the mapping relationship, and after it is determined, according to the mapping relationship, that the virtual system is already allocated to the network device, generate a second allocation response message, where the second allocation response message includes the virtual system information, and the sending unit 1004 is further configured to send the second allocation response message to the network device.

Figure 12:
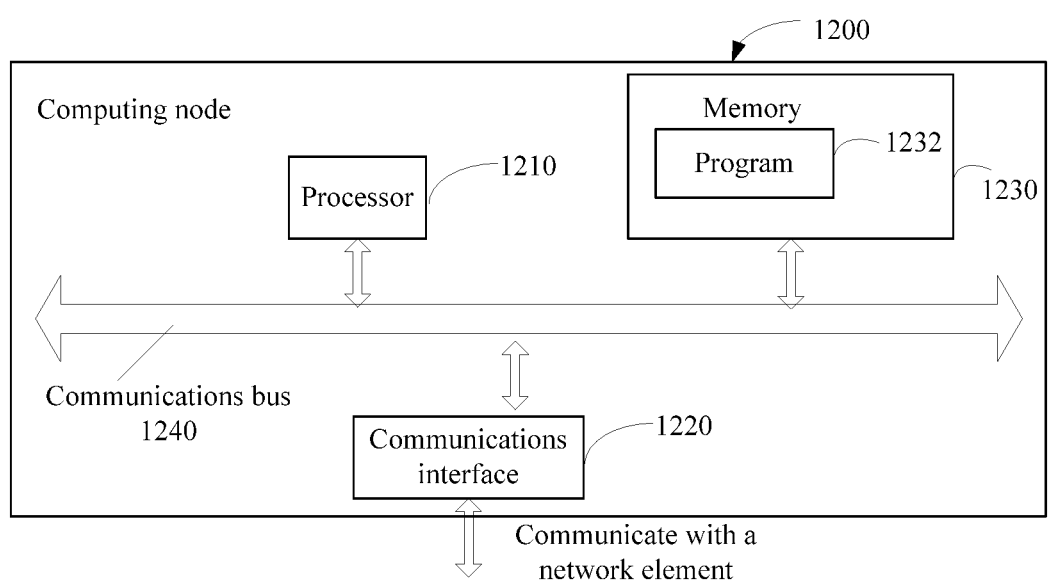
FIG. 12 is a schematic diagram of a structure of still another value-added service device according to an embodiment of the present disclosure.

An embodiment of the present disclosure further provides a computing node 1200. The computing node may be a host server having a computing capability, a value-added service device, or the like, and specific implementation of the computing node is not limited in a specific embodiment of the present disclosure. As shown in FIG. 12, the computing node 1200 includes a processor 1210, a communications interface 1220, a memory 1230, and a communications bus 1240.

The processor 1210, the communications interface 1220, and the memory 1230 communicate with each other using the communications bus 1240.

The communications interface 1220 is configured to communicate with a network element such as a management device 11 and a network device 12. The communications interface 1220 may be implemented using an optical transceiver, an electrical transceiver, a wireless transceiver, or any combination thereof. For example, the optical transceiver may be a SFP transceiver, an SFP+ transceiver, or a XFP transceiver. The electrical transceiver may be an Ethernet NIC. The wireless transceiver may be a WNIC. The communications interface 1220 may include multiple physical interfaces. For example, the communications interface 1220 includes multiple Ethernet interfaces.

The processor 1210 is configured to execute a program 1232.

Further, the program 1232 may include program code, where the program code includes a computer operation instruction.

The processor 1210 may be a CPU, or an ASIC.

The memory 1230 is configured to store the program 1232. The memory 1230 may include a volatile memory, such as a RAM. The memory 1230 may also include a non-volatile memory, such as a ROM, a flash memory, a hard disk, or a SSD. The memory 1230 may further include a combination of memories of the foregoing types.

The processor 1210 is configured to execute the method shown in FIG. 5 or FIG. 6 according to the program 1232.

In the foregoing embodiment of the present disclosure, a value-added service device and a network device are separately disposed such that the value-added service device generates a virtual system for the network device according to a service requirement of the network device, and the network device allocates a virtual slot and a slot number to the virtual system, and manages the virtual system as a value-added service board of the network device. This avoids a problem of complicated policy-based routing configuration that arises when the network device is connected to another value-added service device, implements on-demand deployment and flexible extension of a value-added service, and saves a resource for the value-added service device.

Division of the functional modules provided by the foregoing embodiments is merely exemplary. In actual application, the foregoing functions can be allocated to different functional modules and implemented according to a requirement, to implement all or some of the functions described above.

A person of ordinary skill in the art may understand that all or some of the steps of the methods in the embodiments may be implemented by a program instructing a processor. The program may be stored in a computer-readable storage medium. The storage medium is a non-transitory medium and may be a random access memory, a read-only memory, a flash memory, a hard disk, a solid state disk, a magnetic tape, a floppy disk, an optical disc, and any combination thereof.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A value-added service deployment method, comprising:
receiving, by a network device, a first registration request message sent by a value-added service device, wherein the first registration request message comprises an Internet Protocol (IP) address of the value-added service device;
acquiring, by the network device, according to the first registration request message, virtual system information of a virtual system generated by the value-added service device for the network device;
allocating, by the network device, a virtual slot and a slot number to the virtual system;
sending, by the network device, the slot number to the virtual system according to the virtual system information; and
managing the virtual system as a value-added service board of the network device.

2. The method according to claim 1, wherein acquiring, according to the first registration request message, the virtual system information of the virtual system generated by the value-added service device for the network device comprises:
sending a first allocation request message to the value-added service device according to the first registration request message, wherein the first allocation request message comprises a service requirement of the network device;
receiving a first allocation response message sent by the value-added service device, wherein the first allocation response message comprises the virtual system information of the virtual system generated by the value-added service device for the network device; and
acquiring the virtual system information from the first allocation response message.

3. The method according to claim 1, wherein when the first registration request message further comprises the virtual system information, acquiring, according to the first registration request message, the virtual system information of the virtual system generated by the value-added service device for the network device comprises acquiring, from the first registration request message, the virtual system information of the virtual system generated by the value-added service device for the network device.

4. The method according to claim 1, wherein before receiving, by the network device, the first registration request message sent by the value-added service device, the method further comprises:
receiving a configuration message sent by a management device, wherein the configuration message comprises the IP address of the value-added service device; and
establishing a first mapping relationship between an IP address of the network device and the IP address of the value-added service device according to the configuration message, and
wherein after receiving, by the network device, the first registration request message sent by the value-added service device, the method further comprises:
performing authentication on the value-added service device according to the first mapping relationship; and
executing the operation of acquiring the virtual system information of the virtual system generated by the value-added service device for the network device after authentication succeeds.

5. The method according to claim 1, further comprising:
storing, in a mapping table, a second mapping relationship comprising the IP address of the value-added service device, the virtual system information, and the slot number;
receiving a second registration request message sent by the value-added service device, after the value-added service device or the virtual system restarts, wherein the second registration request message comprises the IP address of the value-added service device; and
allocating the slot number to the virtual system according to the second registration request message.

6. The method according to claim 5, wherein when the second registration request message further comprises the virtual system information, allocating the slot number to the virtual system according to the second registration request message comprises:
searching the mapping table according to the virtual system information, to obtain the second mapping relationship; and
allocating the slot number in the second mapping relationship to the virtual system.

7. The method according to claim 5, wherein allocating the slot number to the virtual system according to the second registration request message comprises:
searching the mapping table according to the IP address of the value-added service device, to obtain the second mapping relationship;
sending a second allocation request message to the value-added service device, wherein the second allocation request message comprises the virtual system information in the second mapping relationship;
receiving a second allocation response message sent by the value-added service device, wherein the second allocation response message comprises the virtual system information; and
allocating the slot number in the second mapping relationship to the virtual system according to the second allocation response message.

8. A value-added service deployment method, comprising:
receiving, by a value-added service device, a configuration message sent by a management device, wherein the configuration message comprises an Internet Protocol (IP) address of a network device;
generating, by the value-added service device, a first registration request message according to the configuration message, wherein the first registration request message comprises an IP address of the value-added service device;
generating, by the value-added service device, a virtual system for the network device;
allocating virtual system information to the virtual system; and
sending, by the value-added service device, the first registration request message and the virtual system information to the network device, wherein the virtual system information is used to enable the network device to manage the virtual system as a value-added service board of the network device.

9. The method according to claim 8, wherein the configuration message further comprises a service requirement of the network device, wherein generating the virtual system for the network device comprises generating the virtual system for the network device according to the service requirement in the configuration message, and wherein sending the first registration request message and the virtual system information to the network device comprises:
- adding the virtual system information to the first registration request message; and
- sending, to the network device, the first registration request message to which the virtual system information is added.

10. The method according to claim 8, wherein generating the virtual system for the network device comprises:
- receiving a first allocation request message sent by the network device, wherein the first allocation request message comprises a service requirement of the network device; and
- generating the virtual system for the network device according to the service requirement of the network device, and
- wherein sending the first registration request message and the virtual system information to the network device comprises:
  - sending the first registration request message to the network device before receiving the first allocation request message sent by the network device; and
  - sending the virtual system information to the network device using a first allocation response message, after receiving the first allocation request message sent by the network device.

11. The method according to claim 8, wherein after generating the virtual system for the network device, and wherein allocating the virtual system information to the virtual system, the method further comprises:
- storing, by the value-added service device in a mapping table, a mapping relationship between the IP address of the network device and the virtual system information;
- generating, by the value-added service device, a second registration request message according to the mapping relationship, after the value-added service device or the virtual system restarts, wherein the second registration request message comprises the IP address of the value-added service device;
- acquiring, by the value-added service device, the virtual system information; and
- sending, by the value-added service device, the second registration request message and the virtual system information to the network device.

12. The method according to claim 11, wherein acquiring, by the value-added service device, the virtual system information comprises acquiring, by the value-added service device, the virtual system information according to the mapping relationship, and wherein sending, by the value-added service device, the second registration request message and the virtual system information to the network device comprises:
- adding, by the value-added service device, the virtual system information to the second registration request message; and
- sending, to the network device, the second registration request message to which the virtual system information is added.

13. The method according to claim 11, wherein sending, by the value-added service device, the second registration request message and the virtual system information to the network device comprises:
- sending, by the value-added service device, the second registration request message to the network device;
- receiving a second allocation request message sent by the network device, wherein the second allocation request message comprises the virtual system information, and wherein the second allocation request message is used to request the value-added service device to reallocate the virtual system to the network device;
- searching the mapping table according to the second allocation request message, to obtain the mapping relationship;
- generating a second allocation response message, after it is determined, according to the mapping relationship, that the virtual system is already allocated to the network device; and
- sending the second allocation response message to the network device, wherein the second allocation response message comprises the virtual system information.

14. A network device, comprising:
- a communication interface configured to communicate with a value-added service device;
- a memory coupled to the communication interface, and configured to store a program; and
- a processor coupled to the memory and the communication interface, and configured to execute the program to:
  - receive a first registration request message sent by the value-added service device, wherein the first registration request message comprises an Internet Protocol (IP) address of the value-added service device;
  - acquire, according to the first registration request message, virtual system information of a virtual system generated by the value-added service device for the network device;
  - allocate a virtual slot and a slot number to the virtual system;
  - send the slot number to the virtual system according to the virtual system information; and
  - manage the virtual system as a value-added service board of the network device.

15. The network device according to claim 14, wherein the processor is further configured to execute the program to:
- send a first allocation request message to the value-added service device according to the first registration request message, wherein the first allocation request message comprises a service requirement of the network device;
- receive a first allocation response message sent by the value-added service device, wherein the first allocation response message comprises the virtual system information of the virtual system generated by the value-added service device for the network device; and
- acquire the virtual system information from the first allocation response message.

16. The network device according to claim 14, wherein the first registration request message further comprises the virtual system information, and wherein the processor is further configured to execute the program to acquire, from the first registration request message, the virtual system information of the virtual system generated by the value-added service device for the network device.

17. The network device according to claim 14, wherein the processor is further configured to execute the program to:
- receive a configuration message sent by a management device, wherein the configuration message comprises the IP address of the value-added service device;

establish a first mapping relationship between an IP address of the network device and the IP address of the value-added service device according to the configuration message; and perform authentication on the value-added service device according to the first mapping relationship, after receiving the first registration request message sent by the value-added service device.

18. A value-added service device, comprising:

a communication interface configured to communicate with a management device;

a memory coupled to the communication interface and configured to store a program; and a processor coupled to the communication interface and the memory and configured to execute the program to:

receive a configuration message sent by the management device, wherein the configuration message comprises an Internet Protocol (IP) address of a network device;

generate a first registration request message according to the configuration message, wherein the first registration request message comprises an IP address of the value-added service device;

generate a virtual system for the network device;

allocate virtual system information to the virtual system; and send the first registration request message and the virtual system information to the network device, wherein the virtual system information is used to enable the network device to manage the virtual system as a value-added service board of the network device.

19. The value-added service device according to claim 18, wherein the configuration message further comprises a service requirement of the network device, and wherein the processor is further configured to execute the program to:

generate the virtual system for the network device according to the service requirement in the configuration message;

allocate the virtual system information to the virtual system;

add the virtual system information to the first registration request message; and send, to the network device, the first registration request message to which the virtual system information is added.

20. The value-added service device according to claim 18, wherein the processor is further configured to execute the program to:

receive a first allocation request message sent by the network device, wherein the first allocation request message comprises a service requirement of the network device;

generate the virtual system for the network device according to the service requirement of the network device;

allocate the virtual system information to the virtual system;

send the first registration request message to the network device before receiving the first allocation request message sent by the network device; and send the virtual system information to the network device using a first allocation response message after receiving the first allocation request message sent by the network device.

* * * * *